United States Patent
Gupta et al.

(10) Patent No.: US 11,218,427 B1
(45) Date of Patent: Jan. 4, 2022

(54) DETECTING LAGGING NODES IN A TIME-SYNCHRONIZED DISTRIBUTED ENVIRONMENT

(71) Applicant: Zscaler, Inc., San Jose, CA (US)

(72) Inventors: Shweta Gupta, Chandigarh (IN); Abhishek Bathla, Panipat (IN); Kumar Gaurav, Cupertino, CA (US); Chakkaravarthy Periyasamy Balaiah, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 17/113,447

(22) Filed: Dec. 7, 2020

(30) Foreign Application Priority Data

Oct. 24, 2020 (IN) .............................. 202011046454

(51) Int. Cl.
*H04L 29/08* (2006.01)
*H04L 12/861* (2013.01)

(52) U.S. Cl.
CPC .......... *H04L 49/90* (2013.01); *H04L 67/1097* (2013.01)

(58) Field of Classification Search
CPC .................................................. H04L 67/1097
See application file for complete search history.

(56) References Cited

U.S. PATENT DOCUMENTS

| | | | |
|---|---|---|---|
| 8,209,417 B2 | 6/2012 | Kakarla et al. | |
| 8,955,091 B2 | 2/2015 | Kailash et al. | |
| 9,009,693 B2 | 4/2015 | St. John et al. | |
| 9,378,044 B1 | 6/2016 | Gaurav et al. | |
| 9,524,516 B2 | 12/2016 | Mirajkar et al. | |
| 9,619,261 B2 | 4/2017 | Gaurav et al. | |
| 9,672,068 B2 | 6/2017 | Gaurav et al. | |
| 9,710,304 B2 | 7/2017 | Gaurav et al. | |
| 9,747,136 B2 | 8/2017 | Sathyamurthy et al. | |
| 9,760,283 B2 | 9/2017 | Kalipatnapu et al. | |
| 9,766,945 B2 | 9/2017 | Gaurav et al. | |
| 9,912,638 B2 | 3/2018 | Kailash et al. | |
| 9,916,092 B2 | 3/2018 | Saha et al. | |
| 10,007,699 B2 | 6/2018 | Pangeni et al. | |
| 10,205,771 B2 | 2/2019 | Palavalli et al. | |
| 10,210,011 B2 | 2/2019 | Gautam et al. | |
| 10,216,790 B2 | 2/2019 | Kailash et al. | |
| 10,235,473 B2 | 3/2019 | Chagalakondu et al. | |
| 10,261,815 B2 | 4/2019 | Gaurav et al. | |
| 10,353,739 B2 | 7/2019 | Gaurav et al. | |

(Continued)

FOREIGN PATENT DOCUMENTS

WO    2016/141309 A1    9/2016

*Primary Examiner* — Adnan M Mirza
(74) *Attorney, Agent, or Firm* — Clements Bernard Baratta; Lawrence A. Baratta, Jr.; Ryan Odessa

(57) ABSTRACT

Systems and methods include determining log data for a time period at a plurality of senders, wherein each sender is a node in the cloud-based system, and the log data is associated with one or more cloud services; providing the log data to one or more storage clusters, via one or more distributors, for the time period; responsive to all of the plurality of senders performing the providing, moving to a next time period and repeating the determining and the providing; detecting a given sender is a faulty data source or a slow data source; and moving the given sender to a deferred processing list where the given sender does not hold up the moving to the next time period.

20 Claims, 5 Drawing Sheets

(56) References Cited

U.S. PATENT DOCUMENTS

| | | |
|---|---|---|
| 10,432,669 B1 | 10/2019 | Badhwar et al. |
| 10,579,945 B2 | 3/2020 | Gaurav et al. |
| 10,678,581 B2 | 6/2020 | Gaurav et al. |
| 10,678,888 B2 | 6/2020 | Jha et al. |
| 2013/0013652 A1 | 1/2013 | Gupta et al. |
| 2016/0203528 A1 | 7/2016 | Saha et al. |
| 2016/0371109 A1 | 12/2016 | Palavalli et al. |
| 2017/0090760 A1 | 3/2017 | Kalipatnapu et al. |
| 2017/0255890 A1 | 9/2017 | Palavalli et al. |
| 2017/0308547 A1 | 10/2017 | Gupta et al. |
| 2018/0157860 A1 | 6/2018 | Nair et al. |
| 2018/0165698 A1 | 6/2018 | Chandrashekar et al. |
| 2018/0219740 A1 | 8/2018 | Kamath et al. |
| 2019/0356609 A1* | 11/2019 | Grunwald ............. G06F 3/0653 |
| 2019/0370078 A1 | 12/2019 | Jha et al. |
| 2019/0370414 A1 | 12/2019 | Jha et al. |
| 2019/0370437 A1 | 12/2019 | Jha et al. |
| 2020/0042222 A1 | 2/2020 | Ramaswamy et al. |
| 2020/0274782 A1 | 8/2020 | Balaiah et al. |
| 2020/0274783 A1 | 8/2020 | Sharma et al. |
| 2020/0274784 A1* | 8/2020 | Sharma ............... H04L 41/5067 |

* cited by examiner

DETECTING LAGGING NODES IN A TIME-SYNCHRONIZED DISTRIBUTED ENVIRONMENT

FIELD OF THE DISCLOSURE

The present disclosure relates generally to networking and computing. More particularly, the present disclosure relates to systems and methods for detecting lagging nodes in a time-synchronized distributed environment, such as a cloud-based system.

BACKGROUND OF THE DISCLOSURE

Computing is moving to cloud computing, where various services are delivered elastically to users. An underlying cloud-based system includes various nodes, clusters, servers, etc. located in a distributed manner. That is, a cloud-based system can be referred to as a distributed environment. In time-synchronized distributed systems, there are multiple data sources located at different geographic locations sending logs to storage servers, which are also distributed geographically. As described herein, logs can include any time-indexed data related to the operation of cloud services. A sender sends logs to a distributor to synchronize data by time and forward the same to destination storage servers.

When this time-synchronized approach is followed in such systems, only after the logs are processed from all the incoming data sources is the current processing time advanced on a server. The first advantage this model provides is that distributors do not need to send the time record for each and every data source. Each sender sends the logs in time order, and it could use one of the below two models: 1) Time_record1 <logs> Time_record2<logs> etc., or 2) Each log line contains the time field.

The time record could be significant when time granularity reduces to seconds and milliseconds. Thus it reduces the amount of data volume to be sent. The other main advantage is that real-time reporting can be served much faster as data is already synchronized by the time of recording itself. Hence, a significant report processing overhead is reduced, and different queries can be served much faster as the log records are already sorted by time. In such systems, often there is a problem of delay in processing logs due to one or the other data sources lagging at different times due to different reasons such as not having enough bandwidth to push data, connection timeouts due to network problems, or there is network time update problem on a data source due to which its clock time is lagging behind, etc.

The clock time can be out of synchronization (sync) on a data source due to various reasons such as a network time update server being not reachable for some particular time duration or an incorrect time update on the machine, appropriate Network Time Protocol (NTP) server not configured properly, etc. Such problems can lead to the clock time difference between the data source and the distributor, which can lead to further delay in the processing of logs as it is not possible to advance the processing at the distributor until all of the received logs are received from the data sources including ones having issues.

Due to some faulty data sources which are lagging at a time, the result penalizes all other data sources which are sending data on time, resulting in a lag in data processing for the whole system. Such faulty data sources usually correspond to less than 5% of the total number of senders; hence it does not seem reasonable to penalize the processing in the whole system due to a small fraction of total data sources.

Accordingly, there is a need to identify such faulty data sources and mark to allow data to be processed by the other good data sources in a time-synchronized fashion.

BRIEF SUMMARY OF THE DISCLOSURE

The present disclosure relates to systems and methods for detecting lagging nodes in a time-synchronized distributed environment, such as a cloud-based system. The present disclosure includes identifying faulty data sources (having timing problems) and marks these data sources to allow data processing from other good data sources in a time-synchronized fashion. The faulty data sources can have their data processing delayed when the data arrives, i.e., delayed with respect to the time-synchronized data processed from the good sources. The present disclosure prevents lag from building up in the entire system due to a few faulty data sources. With the majority of records already in sorted order by time, it is possible to optimize queries that involve the time field. With the present disclosure, the main challenge is to detect the slow and problematic data sources fast enough while processing data to prevent it from affecting the entire system. Generally, there is not a single data source that is lagging; instead, there are usually multiple data sources from the same data center which create problems during the same period of time. Thus, the present disclosure identifies the lagging sources aggressive enough to identify multiple faulty data sources to quickly move them out of the synchronized list of nodes into a deferred processing list.

In an embodiment, a cloud-based system includes a plurality of senders for log data associated with one or more cloud services, wherein each sender is a node in the cloud-based system; one or more distributors connected to the plurality of senders; and one or more storage clusters connected to the one or more distributors, wherein each of the plurality of senders, the one or more distributors, and the one or more storage clusters are time-synchronized with one another, wherein the plurality of senders are each configured to send the log data to the one or more storage clusters, via the one or more distributors, in a time-synchronized manner where corresponding log data for each time period is sent in time order where each time period is advanced after all of the plurality of senders have provided their log data for a given time period, and wherein, responsive to a given sender being a faulty data source or a slow data source, the given sender is moved to a deferred processing list where the given sender does not hold up advancement of the time period.

Subsequent to detection of the given sender, a recovery phase can be implemented where the log data from other senders is processed faster than the time period, to enable buffered log data to be cleared. The recovery phase can be terminated once a detected lag is below a given threshold, indicative of recovery. The given sender can be detected based on maintaining state values on the one or more distributors and detection of a lag exceeding a threshold using the state values. A sender can have its time ahead of a time for other nodes, a distributor is configured to alert the sender to queue its log data. When the given sender has its time behind a time for other nodes, the given sender can be detected based on it being consistently a last sender to send log data for a given time period. The faulty data source can be a sender lagging in time, and the slow data source is a sender not having enough bandwidth to push logs at a required rate. The given sender can remain on the deferred processing list for a given amount of time. A plurality of senders can be any of a faulty data source or a slow data source, each of which is moved to the deferred processing list.

In another embodiment, a method includes determining log data for a time period at a plurality of senders, wherein each sender is a node in the cloud-based system and the log data is associated with one or more cloud services; providing the log data to one or more storage clusters, via one or more distributors, for the time period; responsive to all of the plurality of senders performing the providing, moving to a next time period and repeating the determining and the providing; detecting a given sender is a faulty data source or a slow data source; and moving the given sender to a deferred processing list where the given sender does not hold up the moving to the next time period.

In a further embodiment, a storage cluster in a cloud-based system includes one or more servers connected to one or more distributors that are connected to a plurality of senders of log data, wherein each sender is a node in a cloud-based system and the log data is associated with one or more cloud services; wherein the one or more servers are configured to receive the log data in a time-synchronized manner where corresponding log data for each time period is received in time order where each time period is advanced after all of the plurality of senders have provided their log data for a given time period, wherein, responsive to a given sender being a faulty data source or a slow data source, the given sender is moved to a deferred processing list where the given sender does not hold up advancement of the time period.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

DETAILED DESCRIPTION OF THE DISCLOSURE

Again, the present disclosure relates to systems and methods for detecting lagging nodes in a time-synchronized distributed environment, such as a cloud-based system. The present disclosure includes identifying faulty data sources (having timing problems) and marks these data sources to allow data processing from other good data sources in a time-synchronized fashion. The faulty data sources can have their data processing delayed when the data arrives, i.e., delayed with respect to the time-synchronized data processed from the good sources. The present disclosure prevents lag from building up in the entire system due to a few faulty data sources. With the majority of records already in sorted order by time, it is possible to optimize queries that involve the time field. With the present disclosure, the main challenge is to detect the slow and problematic data sources fast enough while processing data to prevent it from affecting the entire system. Generally, there is not a single data source that is lagging; instead, there are usually multiple data sources from the same data center which create problems during the same period of time. Thus, the present disclosure identifies the lagging sources aggressive enough to identify multiple faulty data sources to quickly move them out of the synchronized list of nodes into a deferred processing list.

Example Cloud-Based System Architecture

Figure 1:
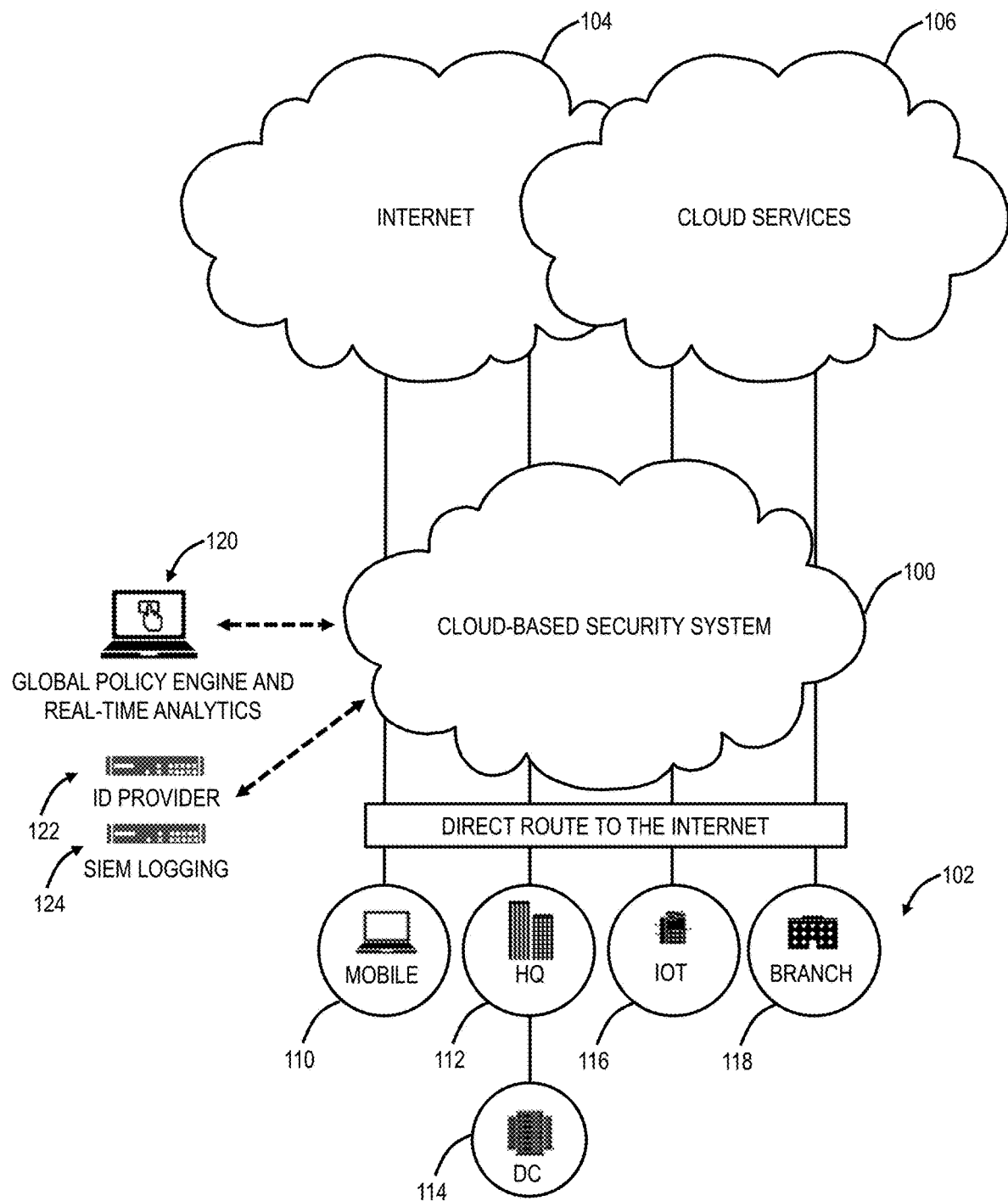
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
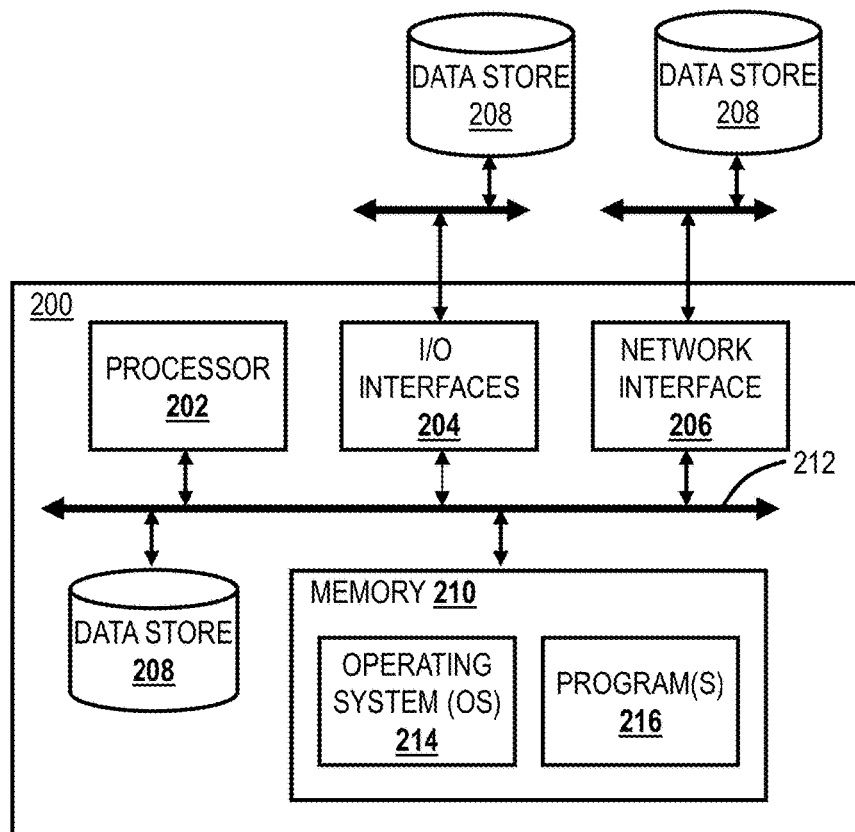

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 106) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
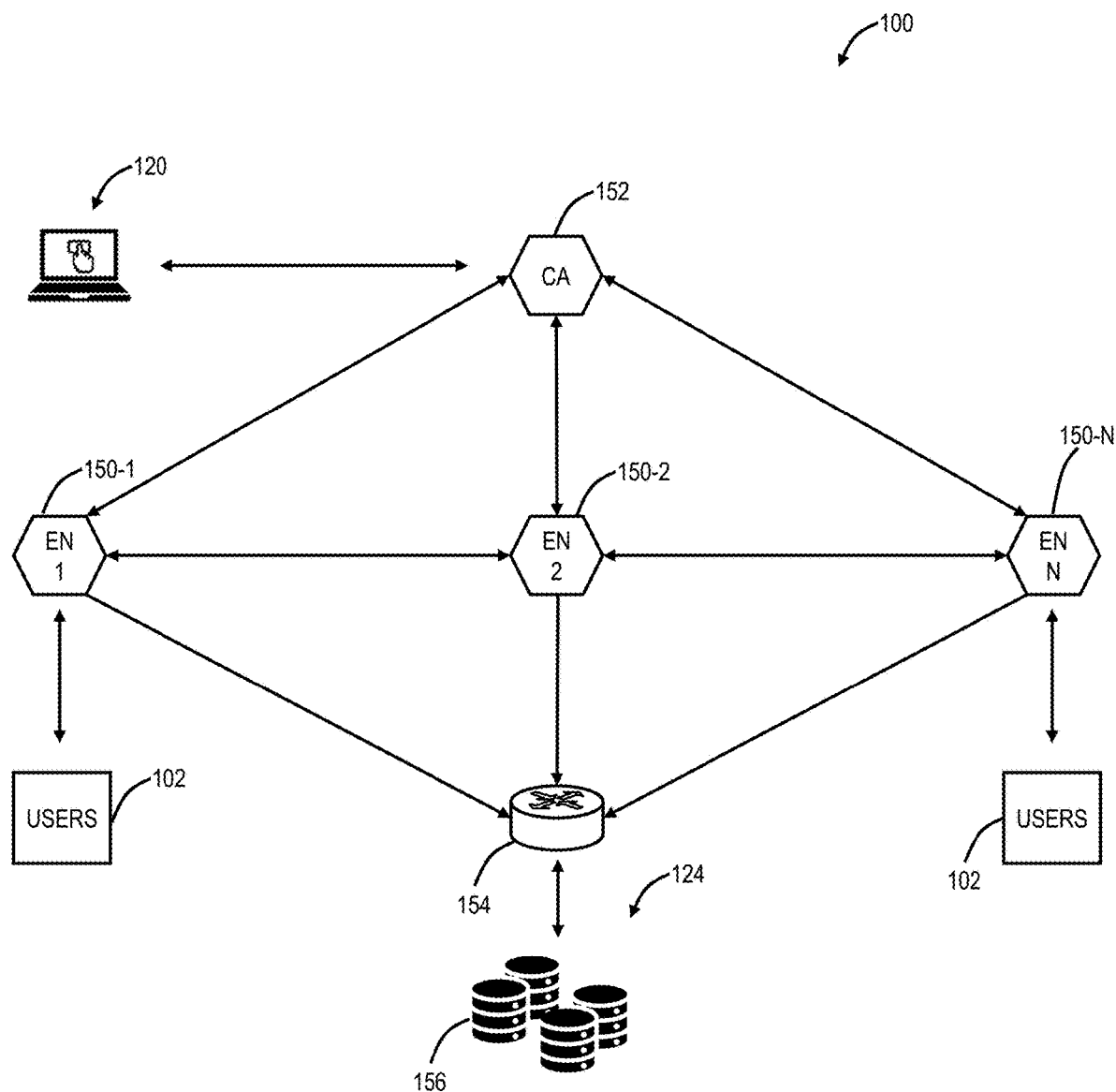
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
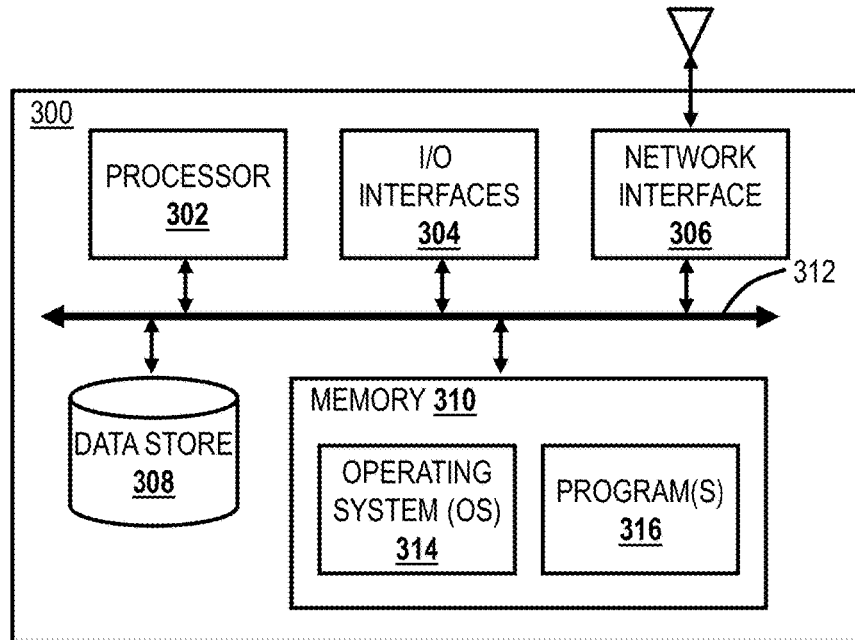

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The present disclosure relates to mobile devices, which are one subset of the user device 300. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Cloud Service Statistics

A key aspect of cloud services includes monitoring, logging, storing, and querying statistics associated with the operation of cloud services. For example, the operation of a cloud service can include a large number of users performing a large number of operations, transactions, etc., each of which is monitored, logged, and stored, and later queried for a variety of purposes. Such statistics can require several thousand variables ranging from hardware, peripheral, network, operating system, memory, process variables indicating errors, exceptions, and events such as virus-detection counts and content classification counts. These variables are sampled over small sampling periods for logging purposes. Logging this statistical data can create an extremely large data collection. For example, a system that logs millions of transactions per second generates log record data that is too large to store or transmit efficiently. Assuming four bytes of information per variable, and 5,000 variables sampled every second, the bandwidth requirement for statistics transmission alone is 160 Kbps.

Commonly-assigned U.S. Pat. No. 8,429,111, issued Apr. 23, 2013, and entitled "Encoding and compression of statistical data," the contents of which are incorporated herein by reference, describes compression techniques for storing such logs. Compression improves the size of log data, but as the features and users of cloud services expand, compressed logs are still unreasonably large. Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage. Commonly-assigned U.S. patent application Ser. No. 16/851,161, filed Apr. 17, 201, and entitled "Systems and methods for efficiently maintaining records in a cloud-based system," the contents of which are incorporated herein by reference, describes efficient storage of transactions.

Again, an example of statistic counters is described in commonly assigned U.S. Pat. No. 8,429,111. The statistic counters can include anything related to users of a cloud-based system 100. For example, the statistic counters for monitoring the status of the cloud-based system 100 can require several thousand variables ranging from hardware, peripheral, network, operating system, memory, process variables indicating errors, exceptions, and events such as virus-detection counts, and content classification counts. In other embodiments, the statistic counters could relate to Operations, Administration, Maintenance, and Provisioning (OAM&P) data; Performance Monitoring (PM); Fault, Configuration, Accounting, Performance, Security (FCAPS) data; and the like. For example, for a cloud security service, the logs can be related to Web transactions, DNS transactions, firewall transactions, etc. from a large amount of users from multiple tenants, all distributed worldwide.

Commonly-assigned U.S. Pat. No. 9,760,283 notes that the number of statistic counters updated in a given interval is less than the maximum counters available in the memory model 300. For example, on existing production data for the cloud-based system 100, only 1299 out of 8000 possible counters were active in any given enterprise. Accordingly, the systems and methods provide optimization to the memory model 300, where a large set of sparse statistic counters are updated in a given interval with minimal requirements on the memory 210 and the processor 202.

Thus, commonly assigned U.S. Pat. No. 8,429,111 describes compression, and commonly-assigned U.S. Pat. No. 9,760,283 describes memory management for sparsely updated counters. The present disclosure provides additional optimization to further compress records based on an observation that a large amount of data is required to store counter ID, in the context of sparsely updated counters.

Time-Synchronized Distributed System

The cloud-based system 100 is an example of a time-synchronized distributed system. Each enforcement node 150 can be one or more servers 200, such as in a cluster. Each of the enforcement nodes 150 can be a data source as described herein. Again, the enforcement nodes 150 are configured to provide logs based on their processing to the storage cluster 156. Of course, the logs can be related to anything associated with the operation of the cloud-based system, including weblogs, DNS logs, firewall logs, application logs, etc.

Figure 5:
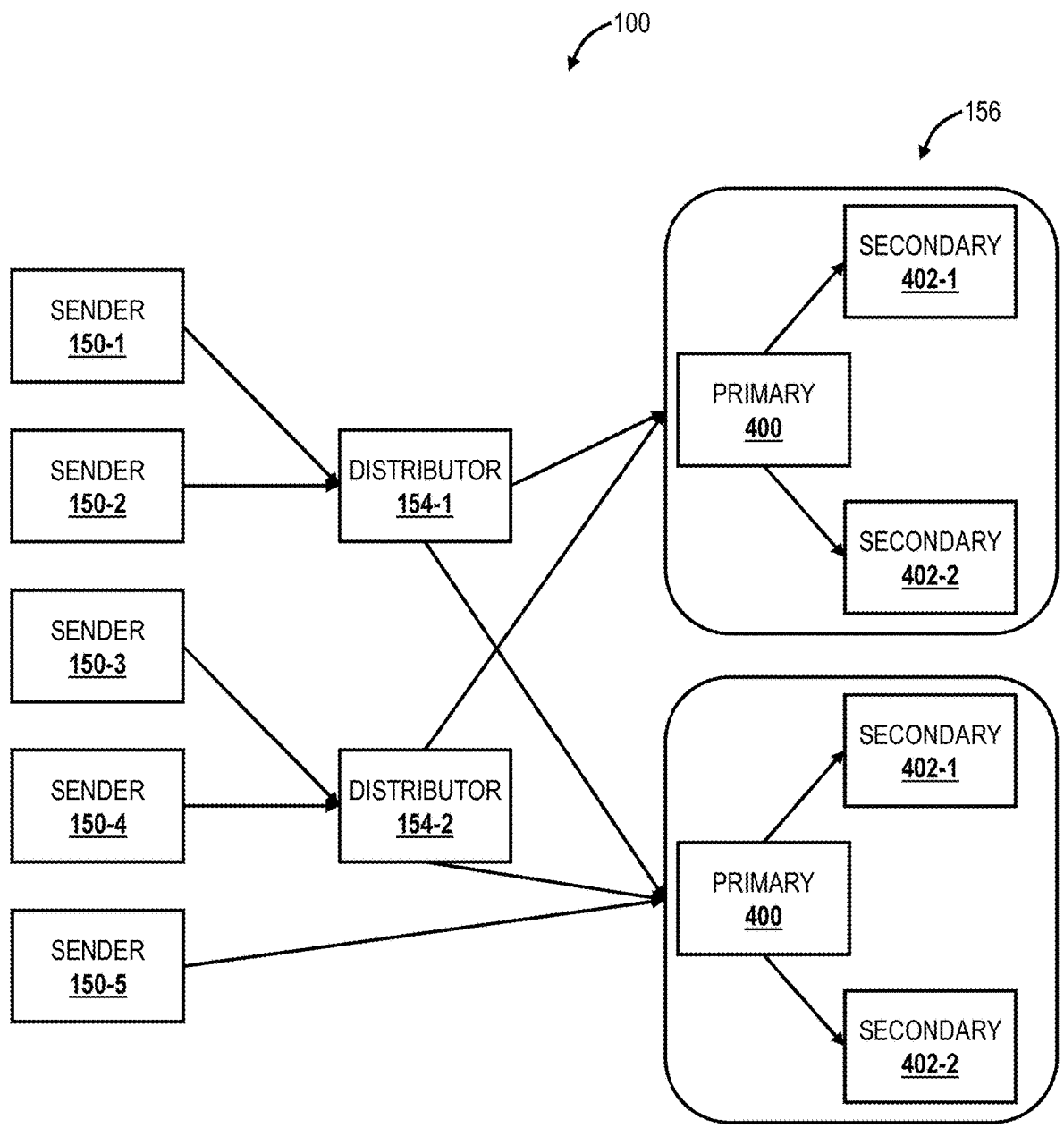
FIG. 5 is a network diagram of the cloud-based system as a time-synchronized distributed system.

FIG. 5 is a network diagram of the cloud-based system 100 as a time-synchronized distributed system. Here, the data sources include the enforcement nodes 150-1-150-5, and these can be referred to as senders, i.e., these are data sources that send information. The log routers 154-1, 154-2 can be referred to as distributors, i.e., distributing data from the senders to the storage clusters 156. In this example, for illustration purposes, there are five senders (enforcement nodes 150-1-150-5), two distributors (log routers 154-1, 154-2), and two storage clusters 156. Of course, other implementations are contemplated with generalized senders, distributors, and storage clusters. That is, the cloud-based system 100 is presented for illustration purposes, and the present disclosure contemplates any time-synchronized distributed system of data sources.

The storage clusters 156 store transaction logs and provide reports. Each of the storage clusters 156 includes a primary server 400 and two secondary servicers 402-1, 402-2. That is, the primary server 400 is an active server and the two secondary servicers 402-1, 402-2 are in a passive standby mode. The active server immediately replicates data to the other two passive servers, so any of them can become active at any time, with no data loss. Also, each server 400, 402-1, 402-3 could be hosted in a separate location to ensure fault tolerance.

In an embodiment, every second, each storage cluster 156 receives logs from all over the world, correlates them to a specific customer organization (tenant), and writes them to disk for high-speed retrieval of reporting and analytics. In a practical example, a storage cluster 156 can process 12 billion or more logs per day. The senders and the storage cluster 156 utilize the time-synchronized data source approach. That is, each sender sends the logs to the storage cluster 156 in time order, and each of the senders should be time-synchronized. As described herein, a faulty data source is a sender lagging in time, and a slow data source is a sender not having enough bandwidth to push logs at the required rate to the distributor. Also, the terms sender, data sources, and sources may be used interchangeably herein, and an example implementation includes the enforcement node 150.

Detection of Slow Senders

This present disclosure can handle both the slow sources as well as the faulty sources. In the example of FIG. 5, assume the sender 150-2 is having some bandwidth issue, and it is not able to push logs at the required rate to the distributor 154-1, e.g., it is taking 2 seconds for pushing the 1 second worth of logs. As it is a time-synchronized system, the distributor 154-1 would wait for sender 150-2 every time for sending the next second's logs to the storage cluster 156 though it would have already received and processed data from the sender 150-1. Until the time it has received all of the data from the sender 150-2, the distributor 154-1 will queue the incoming data for the next second from the sender 150-1. As a result, the storage servers 400, 402 would also wait for data from the distributor 154-1, although they have already received data from the other distributors 15402. Thus, due to the sender 150-2 being slow, it would result in delaying the processing of data in the entire system.

Slow Source Detection

The process proposed for detecting the slow senders in such a system is explained below. Certain variables are maintained as part of the current state of operation. This state can be maintained in memory by the distributor 154 to which the senders are connected.

The following parameters would be maintained in the state:

| | |
|---|---|
| 1 | Last synchronized time up to which logs have been processed from all incoming data sources when the process started (start_sync_time = sync_time at the start of the process) |
| 2 | Clock time when the process started (start_clocktime) |
| 3 | Current expected log rate (expected_processing_rate) |
| 4 | Sync time when the processed logs from all sources are received, i.e., the start of the recovery phase (Recovery_phase_starttime) |
| 5 | Clock time at the start of the recovery phase (Recovery_phase_start_clocktime) |
| 6 | Next probe time in the recovery phase (Recovery_phase_next_probetime) |
| 7 | Difference between clock time and current sync_time (Lag) |
| 8 | Lag tolerance value for the current phase (Current_lag_tolerance) |

The process can be in one of the following phases at a particular time, namely a live phase, a recovery phase, a high resource phase, and an older log phase. For illustration purposes, the present disclosure assumes logs are being sent at the granularity of 1 second. Of course, other time periods are contemplated.

Live Phase

When the system is live, i.e., when the data for logs of 1 second is being processed at the expected rate of 1 second, the process is in the live phase. For example, there can be a lag of a maximum of 128 seconds in this phase. Thus, the lag tolerance value for this phase is 128 and the expected processing rate is 1×, i.e. Current_lag_tolerance=128 and Expected_processing_rate=1. The lag is checked periodically at a probe interval (e.g., at a probe interval of 8 seconds) to determine whether the Current_lag_tolerance has been exceeded, i.e., 128 seconds.

When the lag exceeds this tolerance value, a snapshot of the current state of all data sources is taken.

Snapshot

The last timestamp received from every input data source is checked to find out all the sources which have the last timestamp equal to the current synchronized time (i.e., time up to which all data has been processed) and along with this, there is no data queued in their input buffers. These sources must be the senders, which are blocking the sync_time to move ahead for the current second and due to which the lag has exceeded the set threshold value for the last period of time. The above statement is true because, if all the sources would have been sending data at the desired rate every second and only for some last intermittent seconds they are lagging behind, then they must be having data queued in their input buffers and the lag has not increased the threshold of 128 seconds. Thus, all of the senders for which the system is currently waiting and which have no data present in their input buffers must be the slow sources that are responsible for creating lag.

Action

After detecting the slow senders, the slow senders are moved out of a live list and are blocked from joining the live list for a block interval, e.g., the next couple of hours (block interval which can be changed depending upon the pattern, by default: 2 hours). Moving them out of the live list means that from now onwards, there is no wait for the data from them to arrive to finish the current second (time period) processing.

The data from slow sources would be processed as and when it arrives under the sync time interval at that time.

There can be a case where the process is not able to find any data source which has queue empty, but the process is waiting for them. In that case, there might be the node-specific problem on that server itself (e.g., processor cycles are not available to process data at the required rate, it is in flow control due to some other reason), in which case the process would not take any action and just generate an alert for this node.

Recovery Phase

After detecting the slow senders from the live phase, the process enters the recovery phase. The expected rate of data processing in this phase is 2×. It means the process assumes that after detecting the slow senders and moving them out, all remaining senders send data on time, and the data should be processed at twice the rate. This statement holds true because while in the live phase, the good senders must have already sent their data to the server and are queued in their input buffers. The next probe time for taking action in the recovery phase is set as current time+32 seconds, for example. These 32 seconds are a catch-up time for the recovery phase to operate to clear the input buffers. Thus, it is assumed that in the next 32 seconds, the process should process the data worth 64 seconds. If this is not the case, the process will again take the snapshot and take action against the slow senders based upon the same condition as described above for the live phase.

The state variables value would change as given below when the process enters the recovery phase after taking action (both when the process moves from live to the recovery phase, or when the process moves to the recovery phase again after every 32 seconds).

expected_processing_rate=2
Recovery_phase_starttime=Current sync time (up to which data has been processed from all sources)
Recovery_phase_start_clocktime=System clock time when moving to recovery phase
Recovery_phase_next_probetime=Recovery_phase_start_clocktime+32 seconds
Current_lag_tolerance=32 seconds The process would exit the recovery phase and enter the live phase again when the following condition holds true:
(current clock_time−start_clocktime)−(weblog_time−start_sync_time)<32

Thus, in other words, the process would remain in the recovery phase until the lag developed since the start of the process has been reduced to less than 32 seconds.

Known Events

There can be many other events that can happen in the cloud-based system 100, while the data is being processed. For example, there can be a connection close from a downstream node like a connection close between the distributor and the storage server due to which the storage server would request the data from the distributor from a time older than the distributor's current sync_time. In such events, the sync_time can go backward, and there can be lag introduced irrespective of the upstream senders sending data on time. Thus, in such cases, the process state is reset. Another event can be when the distributor goes into the flow control due to not sending data at the required rate to the storage server, or one sender can move from one distributor to another.

There are two other phases of the slow source detection algorithm described below in the case of two different types of known events.

High Resource Phase

The high resource usage could be due to more buffering as downstream nodes are slow. In this case, the process is not applied.

Older Log Phase

Downstream nodes are requesting older logs, and, in this case, the recovery rate is the same as in the recovery phase. The process would exit this phase when the current absolute lag (current clock_time−current sync_time) becomes less than 128 seconds. And it enters into the live phase.

Detecting Network Time Update Problem on a Sender

If there is a time synchronization problem on a sender, its clock time can be behind or ahead of the clock time of the server 400, 402. When clock time is ahead, the distributor can just send an alert to indicate that the sender has its clock time in the future, and it can queue the incoming data. However, when the clock time of the sender is behind the clock time of the server, it would lead to delayed sending of data by this sender to the distributor resulting in building up of lag in the system. The process to detect such senders is based upon the key observation that nodes with an incorrect clock time typically end up having an almost constant offset from the actual clock time with a slowly adding skew. Thus, if there is a constant lag in the system, and, every second, the same sender as the last sender is seen as the last sender before moving ahead, it means there is an NTP problem on this sender.

This detection process is as follows. The approach is a sampling-based process. The sampling-based process maintains a sample buffer to check the last sender to send the data to the distributor every second. A lag threshold value is defined up to which no action is taken.

When the lag has exceeded the set lag threshold value, start recording the last source and the current lag every second in a fixed size sampling buffer for the next period of time (equal to the threshold value). After recording the samples, it is checked whether all samples belong to one source, and the lag value is constant. If this is the case, the action is taken against that sender, marking it, throwing it out of the live list and blocking it for the next couple of hours (depends upon the pattern in the distributed system).

The detection process can include state parameters of Cur_ntp_sample_index and ntp_samples_buffer[lag_threshold].

Pseudocode:
Run every second:
1.) If absolute lag is less than the lag threshold:
Reset the cur_ntp_sample_index to 0.
Else
If cur_ntp_sample_index==ntp_samples_buf_size
Walkthrough the ntp_samples_buffer and check if the senderid and the lag value are the same in all the samples. If this is true, then take action against that sender and reset the cur_ntp_sample_index to 0.
Else:
ntp_samples_buffer[cur_ntp_sample_index++].senderid=last sender id
ntp_samples_buffercur_ntp_sample_index++].lag= (clock_time−sync_time)

Cloud-Based System and Storage Cluster

In an embodiment, the cloud-based system 100 includes a plurality of senders for log data associated with one or more cloud services, wherein each sender is a node 150 in the cloud-based system 100; one or more distributors 154 connected to the plurality of senders; and one or more storage clusters 156 connected to the one or more distributors 154, wherein each of the plurality of senders, the one or more distributors 154, and the one or more storage clusters 156 are time-synchronized with one another, wherein the plurality of senders are each configured to send the log data to the one or more storage clusters 156, via the one or more distributors 154, in a time-synchronized manner where corresponding log data for each time period is sent in time order where each time period is advanced after all of the plurality of senders have provided their log data for a given time period, and wherein, responsive to a given sender being a faulty data source or a slow data source, the given sender is moved to a deferred processing list where the given sender does not hold up advancement of the time period.

Subsequent to detection of the given sender, a recovery phase is implemented where the log data from other senders is processed faster than the time period, to enable buffered log data to be cleared. The recovery phase is terminated once a detected lag is below a given threshold, indicative of recovery. The given sender is detected based on maintaining state values on the one or more distributors 154 and detection of a lag exceeding a threshold using the state values. When a sender has its time ahead of a time for other nodes, a distributor is configured to alert the sender to queue its log data. When the given sender has its time behind a time for other nodes, the given sender is detected based on it being consistently a last sender to send log data for a given time period. The faulty data source can be a sender lagging in time, and the slow data source is a sender not having enough bandwidth to push logs at a required rate. The given sender can remain on the deferred processing list for a given amount of time.

In another embodiment, the storage cluster 156 in a cloud-based system 100 includes one or more servers 400, 402 connected to one or more distributors that are connected to a plurality of senders of log data, wherein each sender is a node 150 in a cloud-based system 100 and the log data is associated with one or more cloud services; wherein the one or more servers 400, 402 are configured to receive the log data in a time-synchronized manner where corresponding log data for each time period is received in time order where each time period is advanced after all of the plurality of senders have provided their log data for a given time period, and wherein, responsive to a given sender being a faulty data source or a slow data source, the given sender is moved to a deferred processing list where the given sender does not hold up advancement of the time period.

Process

Figure 6:
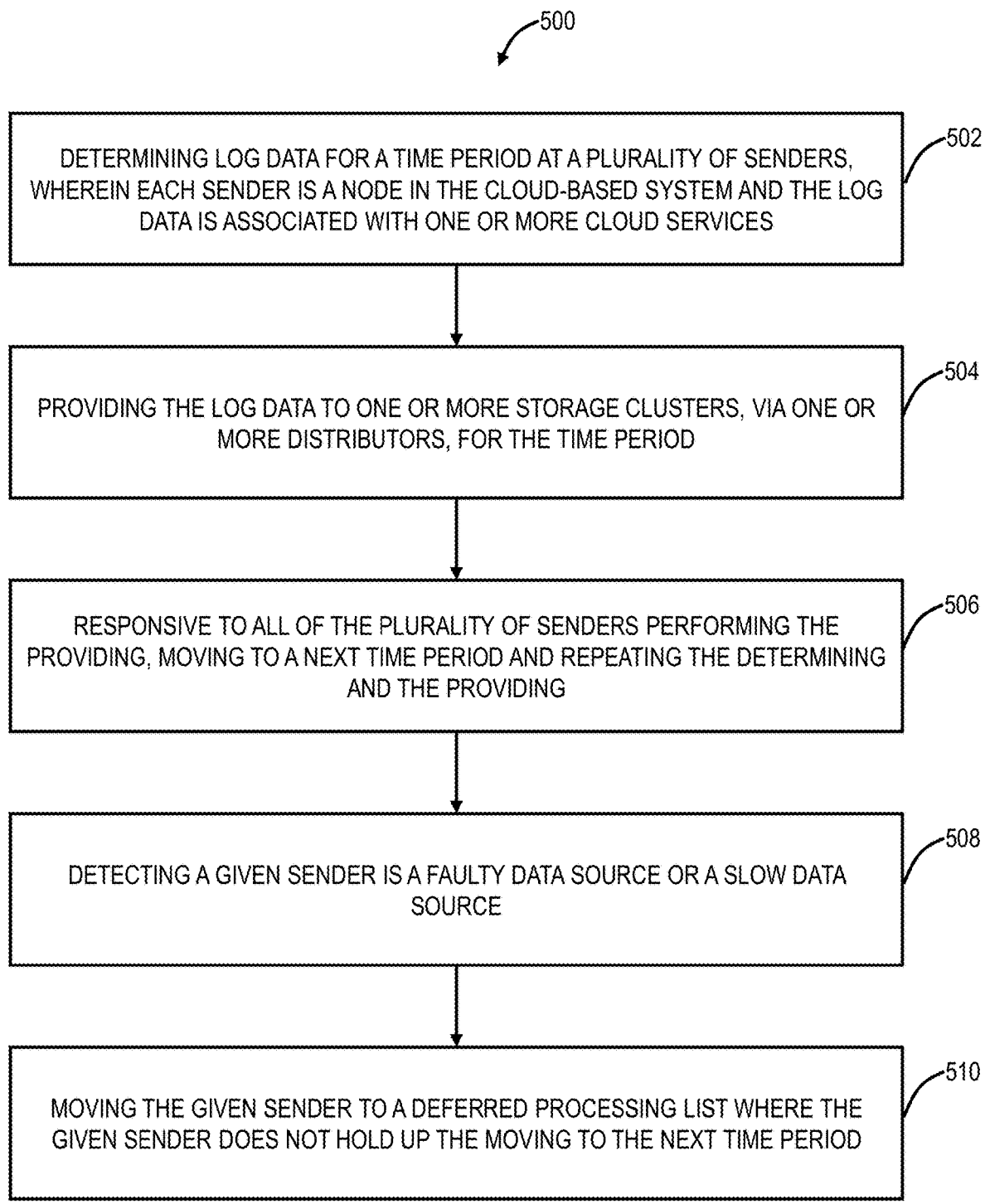
FIG. 6 is a flowchart of a process for handling lag in a time-synchronized distributed system.

FIG. 6 is a flowchart of a process 500 for handling lag in a time-synchronized distributed system. The process 500 includes determining log data for a time period at a plurality of senders, wherein each sender is a node in the cloud-based system and the log data is associated with one or more cloud services (step 502); providing the log data to one or more storage clusters, via one or more distributors, for the time period (step 504); responsive to all of the plurality of senders performing the providing, moving to a next time period and repeating the determining and the providing (step 506); detecting a given sender is a faulty data source or a slow data source (step 508); and moving the given sender to a deferred processing list where the given sender does not hold up the moving to the next time period (step 510).

The process 500 can further include, subsequent to detection of the given sender, implementing a recovery phase where the log data from other senders is processed faster than the time period, to enable buffered log data to be cleared. The recovery phase can be terminated once a detected lag is below a given threshold, indicative of recovery. The detecting can be based on maintaining state values on the one or more distributors and detection of a lag exceeding a threshold using the state values. The process 500 can further include when a sender has its time ahead of a time for other nodes, alerting the sender to queue its log data. The process 500 can further include when the given sender has its time behind a time for other nodes, the detecting is based on it being consistently a last sender to send log data for a given time period. The faulty data source can be a sender lagging in time, and the slow data source can be a sender not having enough bandwidth to push logs at a required rate. The given sender can remain on the deferred processing list for a given amount of time.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A cloud-based system comprising:
a plurality of senders for log data associated with one or more cloud services, wherein each sender is a node in the cloud-based system;
one or more distributors connected to the plurality of senders; and
one or more storage clusters connected to the one or more distributors,
wherein each of the plurality of senders, the one or more distributors, and the one or more storage clusters are time-synchronized with one another,
wherein the plurality of senders are each configured to send the log data to the one or more storage clusters, via the one or more distributors, in a time-synchronized manner where corresponding log data for each time period is sent in time order where each time period is advanced after all of the plurality of senders have provided their log data for a given time period, and the distributors will not advance until receiving data from all senders, resulting in a delay when one or more of the senders are not pushing log data at the required rate, and wherein, responsive to a given sender being a faulty data source or a slow data source, the given sender is moved to a deferred processing list where the given sender does not hold up advancement of the time period.

2. The cloud-based system of claim 1, wherein, subsequent to detection of the given sender, a recovery phase is implemented where the log data from other senders is processed faster than the time period, to enable buffered log data to be cleared.

3. The cloud-based system of claim 2, wherein the recovery phase is terminated once a detected lag is below a given threshold, indicative of recovery.

4. The cloud-based system of claim 1, wherein the given sender is detected based on maintaining state values on the one or more distributors and detection of a lag exceeding a threshold using the state values.

5. The cloud-based system of claim 1, wherein, when a sender has its time ahead of a time for other nodes, a distributor is configured to alert the sender to queue its log data.

6. The cloud-based system of claim 1, wherein, when the given sender has its time behind a time for other nodes, the given sender is detected based on it being consistently a last sender to send log data for a given time period.

7. The cloud-based system of claim 1, wherein the faulty data source is a sender lagging in time, and the slow data source is a sender not having enough bandwidth to push logs at a required rate.

8. The cloud-based system of claim 1, wherein the given sender remains on the deferred processing list for a given amount of time.

9. The cloud-based system of claim 1, wherein a plurality of senders are any of a faulty data source or a slow data source, each of which is moved to the deferred processing list.

10. A method comprising:
   determining log data for a time period at a plurality of senders, wherein each sender is a node in a cloud-based system and the log data is associated with one or more cloud services;
   providing the log data to one or more storage clusters, via one or more distributors, for the time period;
   responsive to all of the plurality of senders performing the providing, moving to a next time period following all of the senders providing log data and repeating the determining and the providing;
   detecting a given sender is a faulty data source or a slow data source; and
   moving the given sender to a deferred processing list where the given sender does not hold up the moving to the next time period.

11. The method of claim 10, further comprising
   subsequent to detection of the given sender, implementing a recovery phase where the log data from other senders is processed faster than the time period, to enable buffered log data to be cleared.

12. The method of claim 10, wherein the recovery phase is terminated once a detected lag is below a given threshold, indicative of recovery.

13. The method of claim 10, wherein the detecting is based on maintaining state values on the one or more distributors and detection of a lag exceeding a threshold using the state values.

14. The method of claim 10, further comprising
   when a sender has its time ahead of a time for other nodes, alerting the sender to queue its log data.

15. The method of claim 10, further comprising
   when the given sender has its time behind a time for other nodes, the detecting is based on it being consistently a last sender to send log data for a given time period.

16. The method of claim 10, wherein the faulty data source is a sender lagging in time, and the slow data source is a sender not having enough bandwidth to push logs at a required rate.

17. The method of claim 10, wherein the given sender remains on the deferred processing list for a given amount of time.

18. The method of claim 10, wherein a plurality of senders are any of a faulty data source or a slow data source, each of which is moved to the deferred processing list.

19. A storage cluster in a cloud-based system comprising:
   one or more servers connected to one or more distributors that are connected to a plurality of senders of log data, wherein each sender is a node in a cloud-based system and the log data is associated with one or more cloud services;
   wherein the one or more servers are configured to receive the log data in a time-synchronized manner where corresponding log data for each time period is received in time order where each time period is advanced after all of the plurality of senders have provided their log data for a given time period, and the distributors will not advance until receiving data from all senders, resulting in a delay when one or more of the senders are not pushing log data at the required rate, and
   wherein, responsive to a given sender being a faulty data source or a slow data source, the given sender is moved to a deferred processing list where the given sender does not hold up advancement of the time period.

20. The storage cluster of claim 19, wherein, subsequent to detection of the given sender, a recovery phase is implemented where the log data from other senders is processed faster than the time period, to enable buffered log data to be cleared.

* * * * *